D. P. WIRT.
Corn-Sheller Separators.
No. 214,542.   Patented April 22, 1879.
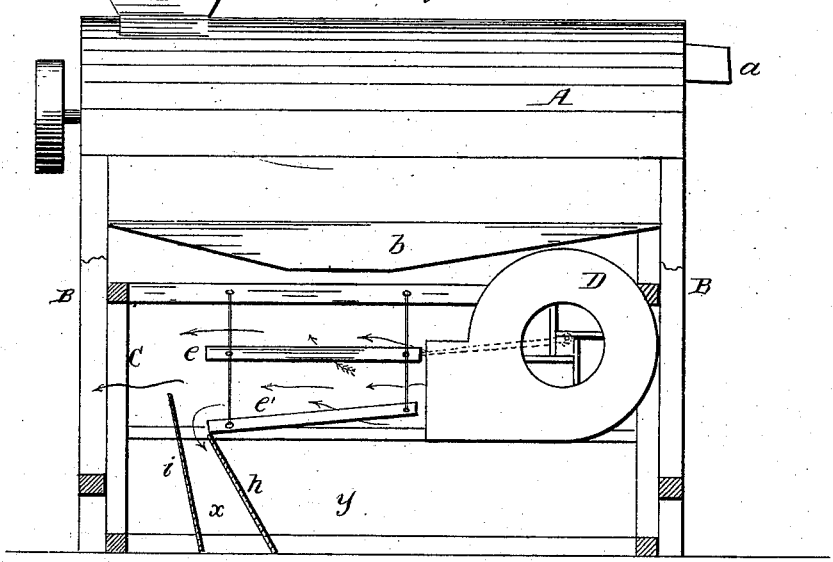
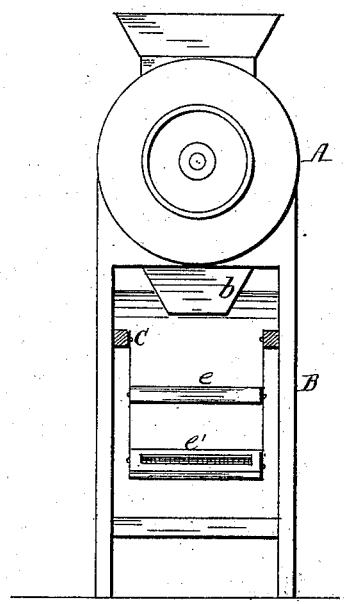

UNITED STATES PATENT OFFICE.

DANIEL P. WIRT, OF OAK GROVE, VIRGINIA.

IMPROVEMENT IN CORN-SHELLER SEPARATORS.

Specification forming part of Letters Patent No. 214,542, dated April 22, 1879; application filed August 2, 1878.

*To all whom it may concern:*

Be it known that I, DANIEL P. WIRT, of Oak Grove, Westmoreland county, Virginia, have invented Improvements in Corn Shellers, of which the following is a specification.

My invention relates more especially to that class of corn-shellers in which the corn and cobs are discharged at different outlets; and has for its objects, first, to separate the chaff, imperfect kernels, and full corn, collecting them in different receptacles; and, second, to provide a means for readily applying a separator to shellers of the ordinary construction.

In the accompanying drawings, which form part of this specification, Figure 1 is a side elevation, partly in section, of a corn-sheller having my improvement; and Fig. 2, an end view, the shields removed.

A is the cylinder, supported by legs B, having a chute, $a$, for discharging the cobs, and a funnel, $b$, through the open lower end of which the corn and chaff pass downward.

A frame, C, below the cylinder A, supports an ordinary fan or blower, D, in front of which are suspended two sieves, $e$ $e'$, to which the vibrating motion is imparted in any suitable manner.

An inclined shield, $h$, extends downward from the front end of the sieve $e'$, and another shield, $i$, in front of the shield $h$, projects upward above the shield $e'$, for the purpose described hereinafter. The upper sieve is somewhat larger in its meshes than the lower.

The corn and chaff which fall from the hopper $d$ are met by a blast of air from the fan D, which blast is of such strength as to carry off not only the lighter particles of chaff, but also the broken bits of cob, &c., which are arrested by the upper sieve, the motion of which facilitates the discharge of the lighter material, while the grains of corn pass to the lower sieve.

As the corn falls to the sieve $e'$, any broken, light, or imperfect grains are carried toward the lower end of the sieve $e'$, the inclination of which insures the passage of a portion of a blast upward, so as to carry these grains away from the meshes and against the shield $i$, by which they are deflected to the chamber $x$, the heavy perfect grains passing to the chamber $y$.

Suitable chutes from both chambers may carry the different qualities of grain to different receptacles.

By this means the chaff is separated without losing the imperfect grains, or mixing them with the perfect kernels.

In order to adapt the separator to the form of sheller represented in the drawings, which is extensively used, I arrange the fan, shields, and sieve upon a frame, C, so that the structure may be sold as an attachment capable of being applied, with little or no change, to the shellers in use.

I claim—

1. The combination, with the sheller having a grain-discharge funnel, $b$, of the fans D, shields $h$ $i$, and suspended vibrating sieves $e$ $e'$, the latter being inclined, and both being arranged to be traversed by the air-currents, and all arranged on the detachable frame C, as set forth.

2. The combination of the fan D, sieves $e$ $e'$, shields $h$ $i$, and detachable supporting-frame C, adapted to the frame of the sheller, as set forth.

In testimony whereof I have signed my name to this specification in the presence of two subscribing witnesses.

D. P. WIRT.

Witnesses:
C. E. FOSTER,
COURTNEY A. COOPER.